United States Patent
Bade et al.

(10) Patent No.: US 12,133,485 B2
(45) Date of Patent: Nov. 5, 2024

(54) HARVESTING MACHINE HAVING A FRAME COUPLING SYSTEM

(71) Applicant: DEERE & COMPANY, Moline, IL (US)

(72) Inventors: Sandeep Bade, Pune (IN); Surfraj Fattepur, Bijapur (IN); Edward W. Franck, Ankeny, IA (US); Shubham Lale, Pune (IN); Rajnikumar Shikhaliya, Jamnagar (IN)

(73) Assignee: DEERE & COMPANY, Moline, IL (US)

( * ) Notice: Subject to any disclaimer, the term of this patent is extended or adjusted under 35 U.S.C. 154(b) by 932 days.

(21) Appl. No.: 16/985,660

(22) Filed: Aug. 5, 2020

(65) Prior Publication Data

US 2021/0386016 A1    Dec. 16, 2021

(30) Foreign Application Priority Data

Jun. 10, 2020   (IN) .............................. 202021024374

(51) Int. Cl.
*A01D 41/14* (2006.01)
*A01D 45/10* (2006.01)

(52) U.S. Cl.
CPC ............ *A01D 41/14* (2013.01); *A01D 45/10* (2013.01)

(58) Field of Classification Search
CPC .................................................... A01D 45/10
See application file for complete search history.

(56) References Cited

U.S. PATENT DOCUMENTS

| 5,513,484 | A | * | 5/1996 | Zehavi | A01D 46/00 56/480 |
| 5,816,037 | A | * | 10/1998 | Chiel | A01D 46/26 56/328.1 |
| 7,716,904 | B2 | | 5/2010 | Diederich, Jr. et al. | |
| 9,961,832 | B2 | | 5/2018 | Scrivner et al. | |
| 10,058,028 | B2 | | 8/2018 | Richard et al. | |
| 10,194,589 | B2 | | 2/2019 | Almeida et al. | |
| 10,356,982 | B2 | * | 7/2019 | Bertino | A01D 63/02 |
| 10,398,080 | B2 | | 9/2019 | Weitenberg et al. | |

(Continued)

FOREIGN PATENT DOCUMENTS

| BR | 102016007269 A2 * | 3/2017 | .......... A01D 34/416 |
| CN | 113795421 A * | 12/2021 | ............. A01D 45/10 |

(Continued)

*Primary Examiner* — Nicole T Verley
(74) *Attorney, Agent, or Firm* — Taft Stettinius & Hollister LLP; Stephen F. Rost

(57) ABSTRACT

A sugarcane harvester for harvesting sugarcane including a main frame, a basecutter, and a coupler configured to couple the main frame to the basecutter, the coupler including a leg rotatably coupled to and extending from one of the main frame or a frame of the basecutter and a receiver fixedly coupled to the other of the main frame or the basecutter frame. A catch is located at the receiver, wherein the catch engages the leg to locate the main frame at a fixed distance with the basecutter. The catch includes a spring actuated plunger to engage a depression in the arm to fixedly couple the basecutter and the main frame. In one embodiment, the sugarcane harvester includes basecutter frames or split frames, each of which is rotatably connected to the mainframe with a coupler.

20 Claims, 9 Drawing Sheets

(56) References Cited

U.S. PATENT DOCUMENTS

| | | | |
|---|---|---|---|
| 2004/0112034 A1* | 6/2004 | Suter | A01D 46/26 56/340.1 |
| 2004/0112035 A1* | 6/2004 | Suter | A01D 46/26 56/340.1 |
| 2008/0256914 A1 | 10/2008 | Ricketts et al. | |
| 2014/0352272 A1 | 12/2014 | Parker et al. | |
| 2017/0280626 A1 | 10/2017 | Bertino | |
| 2021/0386016 A1* | 12/2021 | Bade | A01D 45/10 |
| 2023/0284555 A1* | 9/2023 | Heitkamp | A01D 34/04 56/296 |

FOREIGN PATENT DOCUMENTS

| | | | | |
|---|---|---|---|---|
| CN | 113853111 A | * | 12/2021 | A01D 45/10 |
| EP | 4241555 A1 | * | 9/2023 | A01D 34/04 |
| WO | WO-9724919 A1 | * | 7/1997 | A01D 41/144 |

* cited by examiner

HARVESTING MACHINE HAVING A FRAME COUPLING SYSTEM

CROSS-REFERENCE TO RELATED APPLICATION

This application claims priority to Application Serial No. 202021024374, having the title "Harvesting Machine Having a Frame Coupling System", filed in the Indian Patent Office on Jun. 10, 2020, the disclosure of which is incorporated herein by reference in its entirety.

FIELD OF THE DISCLOSURE

The present invention generally relates to a harvesting machine, and more particularly to a sugarcane harvesting machine having a main frame and a basecutter coupled to the main frame.

BACKGROUND

Agricultural equipment, such as a tractor or a self-propelled harvester, includes mechanical systems, electrical systems, hydraulic systems, and electro-hydraulic systems, configured to prepare fields for planting or to harvest crops.

Harvesters of various configurations, including sugarcane harvesters, have harvesting systems of various types. Harvesting systems for a sugarcane harvester, for example, include assemblies or devices for cutting, chopping, sorting, transporting, and otherwise gathering and processing sugarcane plants. Typical harvesting assemblies, in different embodiments, include a basecutter, feed rollers, and cutting drums.

To actively harvest crops, the sugarcane harvester gathers and processes material from rows of sugarcane plants. In the case of one type of sugarcane harvester, the sugarcane stalks are cut from the ground and gathered by the basecutter. Once cut, the gathered sugarcane stalks are cut into billets that move through a loading elevator to an elevator discharge, where the cut sugarcane stalks are discharged to a collector, such as the sugarcane wagon. Leaves, trash, and other debris are separated from the billets and ejected onto the field.

In various harvesters, harvesting assemblies are hydraulically powered by an engine-driven pump or electrically powered by a generator or other electrical power supply. The harvesting assemblies include rotating drums that move the cut stalks toward a chopper. The rotating drums are driven by a hydraulic motor or an electric motor that rotationally drives the roller to continuously move the billets to the wagon or other container. The motors include splines that engage the roller to drive the roller about a rotation axis.

In one or more embodiments, the basecutter is a subassembly of parts supported by a frame, i.e. a basecutter frame, which is operatively connected to a main frame during manufacture. The basecutter frame and the main frame are joined during a manufacturing process with other subassemblies that include additional parts and components to complete the sugarcane harvester.

In one embodiment, due to the size of the mainframe, the mainframe remains stationary while the basecutter assembly and other subassemblies are moved to the mainframe to complete assembly of the sugarcane harvester. While moving the basecutter assembly to the mainframe can be achieved in a relatively straightforward manner, completing the connection of the basecutter assembly to the main frame can be difficult, due to the limited access to connection locations.

What is needed therefore is a frame coupling system that reduces the time spent connecting subassemblies and improves the positioning of adjacent subassemblies during the manufacturing process.

SUMMARY

In one embodiment, there is provided a sugarcane harvester for harvesting sugarcane including a main frame, a basecutter frame, and a coupler configured to couple the main frame to the basecutter frame. The coupler includes a leg rotatably coupled to and extending from one of the main frame or the basecutter frame. A receiver is fixedly coupled to the other of the main frame or the basecutter frame. A catch is located at the receiver, wherein the catch engages the leg to locate the main frame at a fixed distance with the basecutter frame.

In another embodiment, there is provided a coupler configured to couple a first frame to a second frame of a work machine. The coupler includes a leg rotatably coupled to and extending from one of the first frame or the second frame and a receiver fixedly coupled to the other of the first frame or the second frame. A catch is located at the receiver, wherein the catch engages the leg to locate the first frame at a fixed distance with the second frame.

In a further embodiment, there is provided a method of connecting a basecutter frame of a sugarcane harvester to a main frame of the sugarcane harvester. The method includes: aligning a male coupler rotatably coupled to the main frame with a female receiver fixedly coupled to the basecutter frame; and moving the basecutter frame toward the main frame to engage the male coupler with the female receiver until a catch engages a distal end of the male coupler.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

Figure 1:
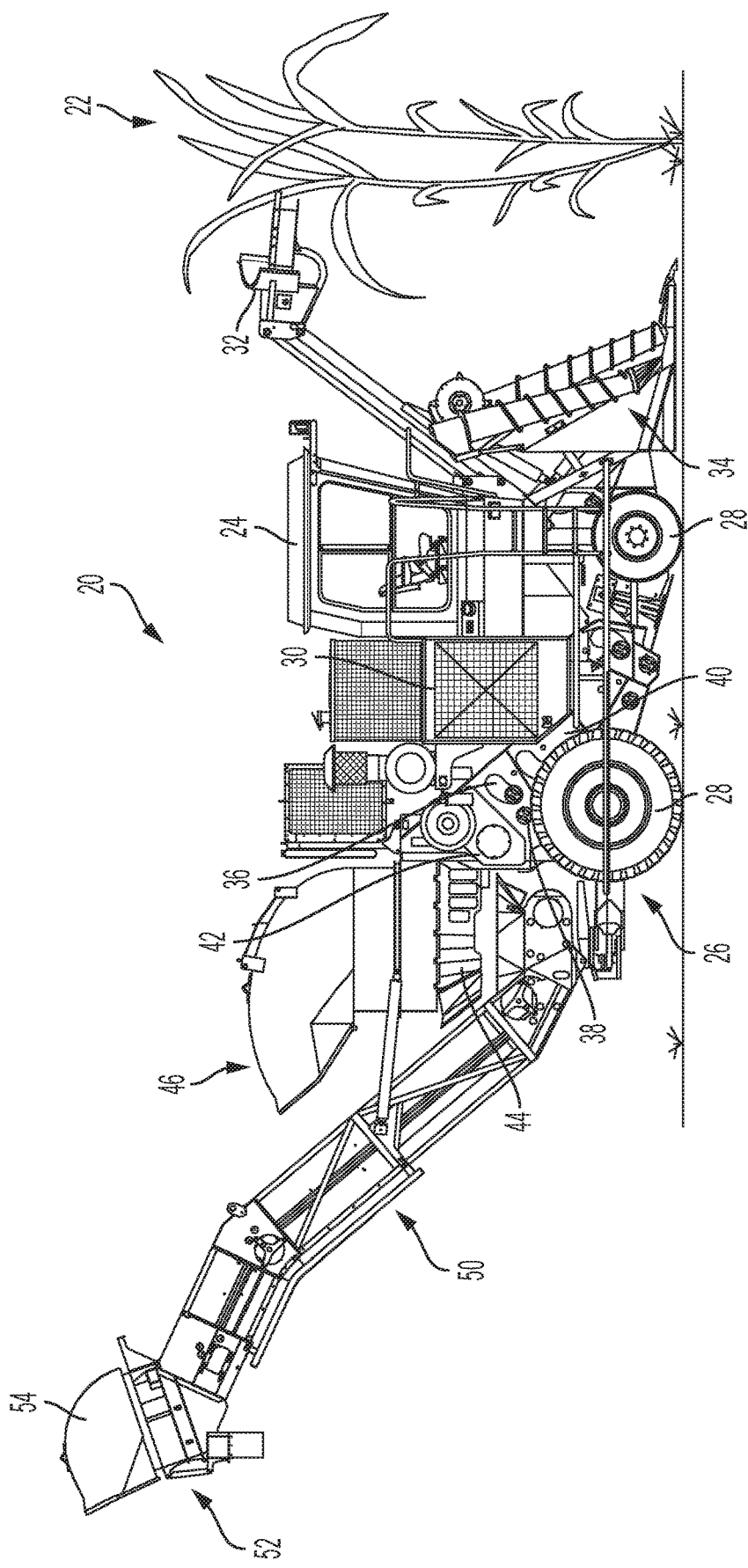
FIG. 1 illustrates a side elevational view of a work vehicle, and more specifically, of an agricultural vehicle such as a sugarcane harvesting machine.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

FIG. 1 illustrates a side view of a sugarcane harvester 20 adapted to cut sugarcane 22, with the front of the harvester 20 facing to the right. Accordingly, certain components of the harvester 20 may not be visible in FIG. 1. The harvester 20 includes a cab 24 located on a main frame 26 that is supported by wheels 28 configured to move the harvester along rows of sugarcane 22. An engine is located within a housing 30 that moves the wheels 28 along a field to continually cut the sugarcane 22 for harvesting. In different embodiments, the engine also powers various driven components of the harvester 20. In certain embodiments, the engine directly powers one or more hydraulic pumps (not shown) and other driven components powered by the hydraulic motors via an embedded hydraulic system (not shown).

A cane topper 32 extends forward of the frame 26 in order to remove the leafy tops of sugarcane plants 22. A set of crop dividers 34 guides the stalks of sugarcane toward internal mechanisms of the harvester 20 for processing. As the harvester 20 moves across a field, sugarcane plants passing between the crop dividers 34 are deflected downward by one or more knockdown rollers before being cut near the base of the plants 22 by a base cutter assembly, as would be understood by one skilled in the art. Rotating disks, guides, or paddles (not shown) on the base cutter assembly further direct the cut ends of the plants upwardly and rearward within the harvester 20 toward successive pairs of upper feed rollers 36 and lower feed rollers 38. The feed rollers 36 and 38 are supported by a feed roller chassis 40 which is supported by the main frame 26. The upper and lower feed rollers 36 and 38 convey the stalks toward a chopper drum module 42 for chopping the stalks into billets.

The chopper drum module 42 includes upper and lower chopper drums that rotate in opposite directions in order to chop the moving stalks into billets, as would be understood by one skilled in the art. The billets, including crop residue, are propelled into a cleaning chamber 44 that is located at the base of a primary extractor 46. The primary extractor 46, in different embodiments, includes a powered fan to extract the crop residue, trash, and debris from the cleaning chamber 44. A loading elevator 50, with a one end located at the bottom of the cleaning zone 44, conveys the cleaned billets upwardly to a discharge location 52, below a secondary extractor 54, where the billets discharged into a truck, a wagon, a container, or other receptacle that collects the discharged billets. The secondary extractor 54 separates the crop residue from the cut stalk to clean the cut stalk.

Figure 2:
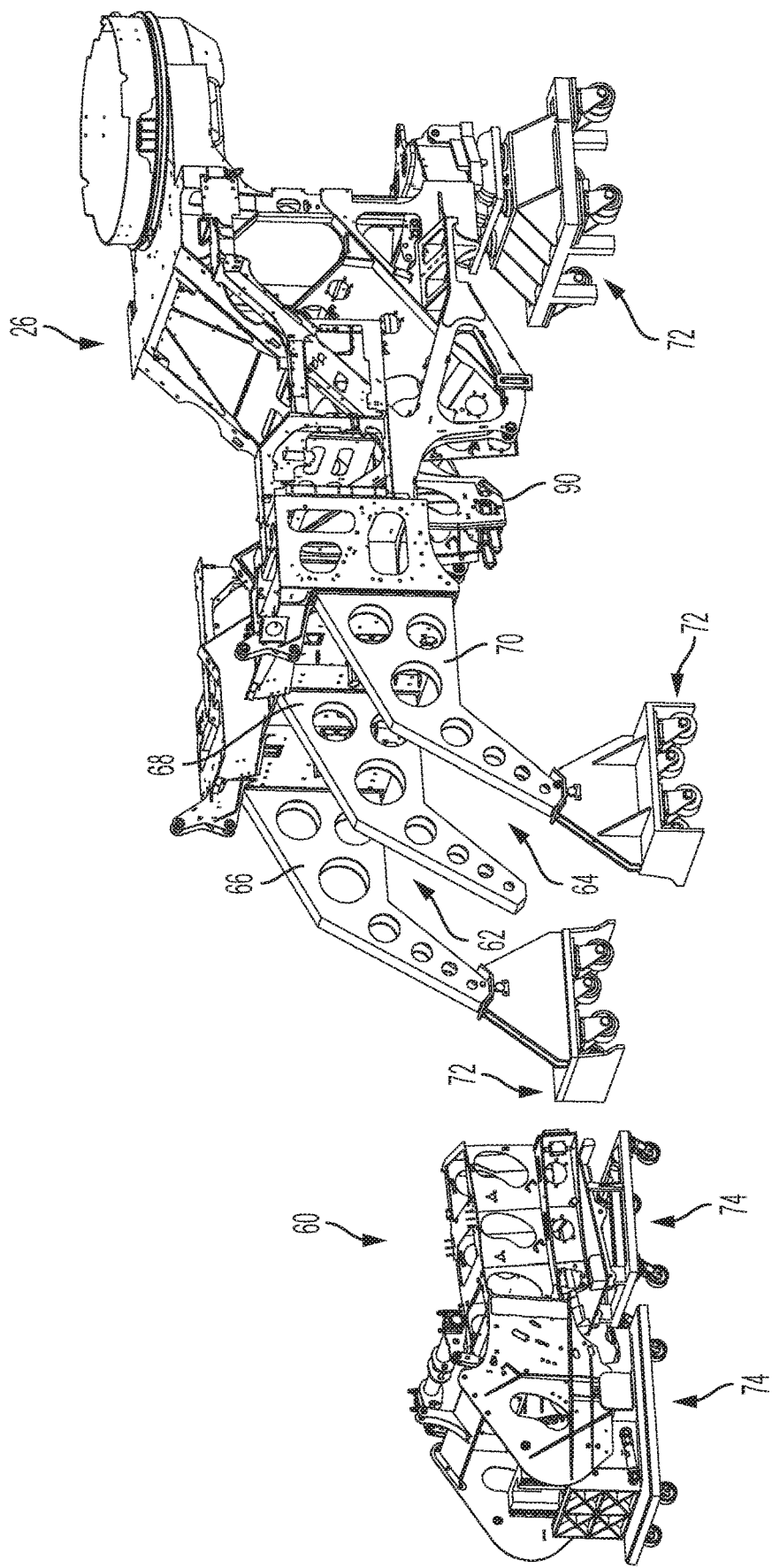
FIG. 2 illustrates a perspective view of a basecutter spaced from a main frame.

The main frame 26 is operatively connected to a basecutter assembly 60, or "basecutter", as seen in FIG. 2. In the illustrated embodiment, the main frame 26 is coupled to a first basecutter, the basecutter 60, and a second basecutter, not shown. The basecutter 60 after being connected to the main frame 26 is located in a first basecutter bay 62, and the second basecutter, would be located in a second basecutter bay 64. The main frame 26 includes a first outer frame support 66, a central frame support 68, and a second outer frame support 70. The central frame support 68 defines the first basecutter bay 62 and the second basecutter bay 64 with each of the outer frame supports 66 and 70.

The main frame 26 is supported on frame supports 72 during manufacture of the vehicle 20 to enable the basecutters to be moved into the respective bays to operatively connect the basecutters to the main frame. In one embodiment, the basecutter frames, which are part of the basecutters, are each supported on a roller support, i.e. roller support 74. The basecutter 60 is rolled into the bay 62 for connection to the main frame 26. In the illustrated embodiment, each of the basecutters is also known as a split frame. In other embodiments, a single basecutter is used and extends between the first outer frame support 66 and the second outer frame support 70 and the inner frame support 68 is missing. In a single basecutter embodiment, a male female coupler is used on either side of the main frame 26.

In a current process of assembling a split frame to a main frame of the work vehicle, the split frame is moved to a connecting location at the main frame. Once the split frame is moved to the appropriate location, a pivot pin is inserted into adjacently located parts of the split frame and the main frame. Due to the locations of the connections, an assembly operator must move to a location under the mainframe. Once the appropriate parts are properly aligned, the pivot pin is inserted at the connection location, which is a pivotable connection between the main frame and the split frame. The area at which the assembly operator must be located is ergonomically confining. Because access to the connection locations is quite restrictive, the assembly operation is relatively difficult. This results in an increase in labor time to complete the assembly operation and a possibility of poor build quality.

Figure 3:
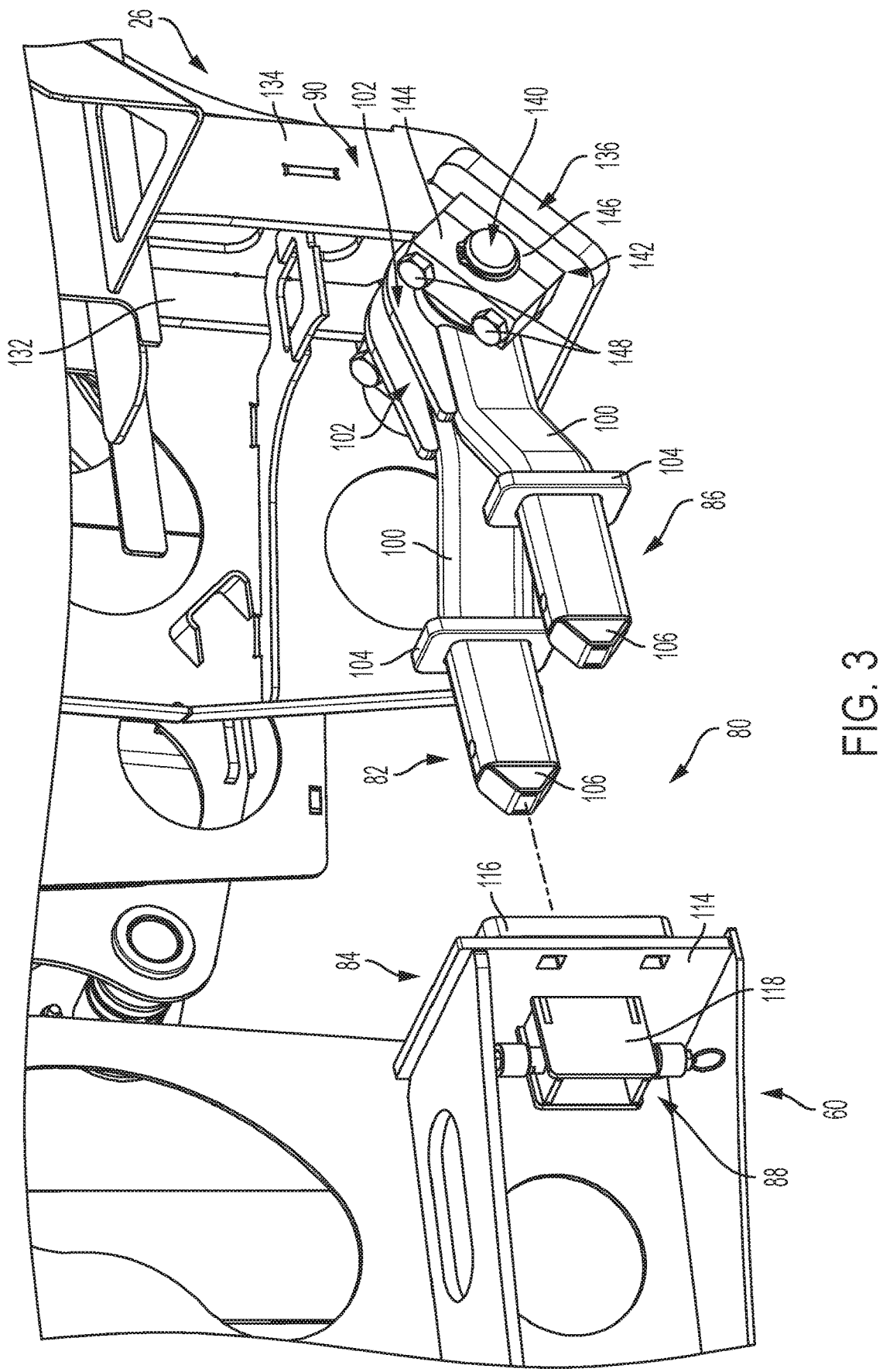
FIG. 3 illustrates a perspective view of a female coupler of a basecutter and male coupler of a main frame before being connected.
Figure 4:
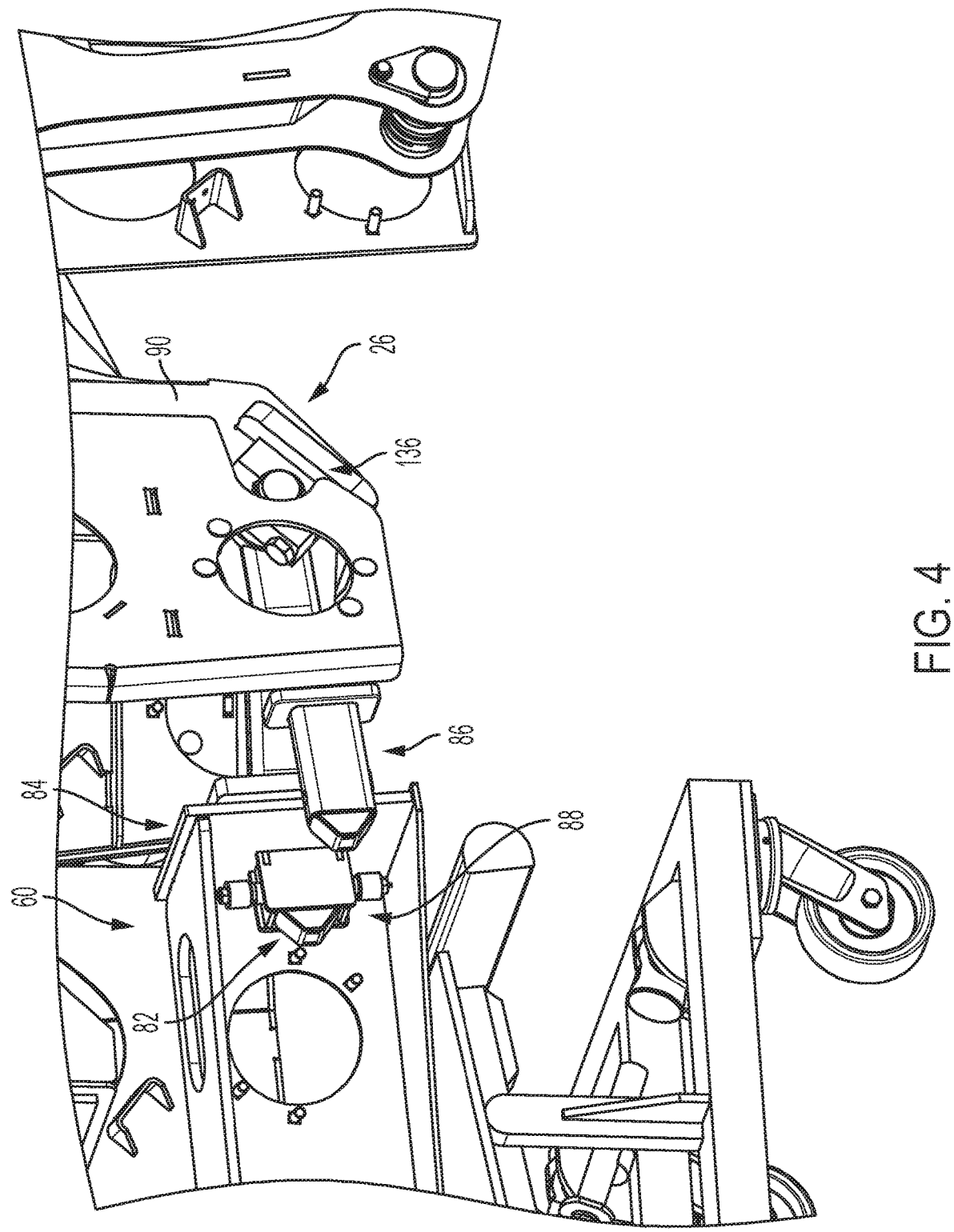
FIG. 4 illustrates a perspective view of a male coupler of a main frame connected to a female coupler of a basecutter.
Figure 5:
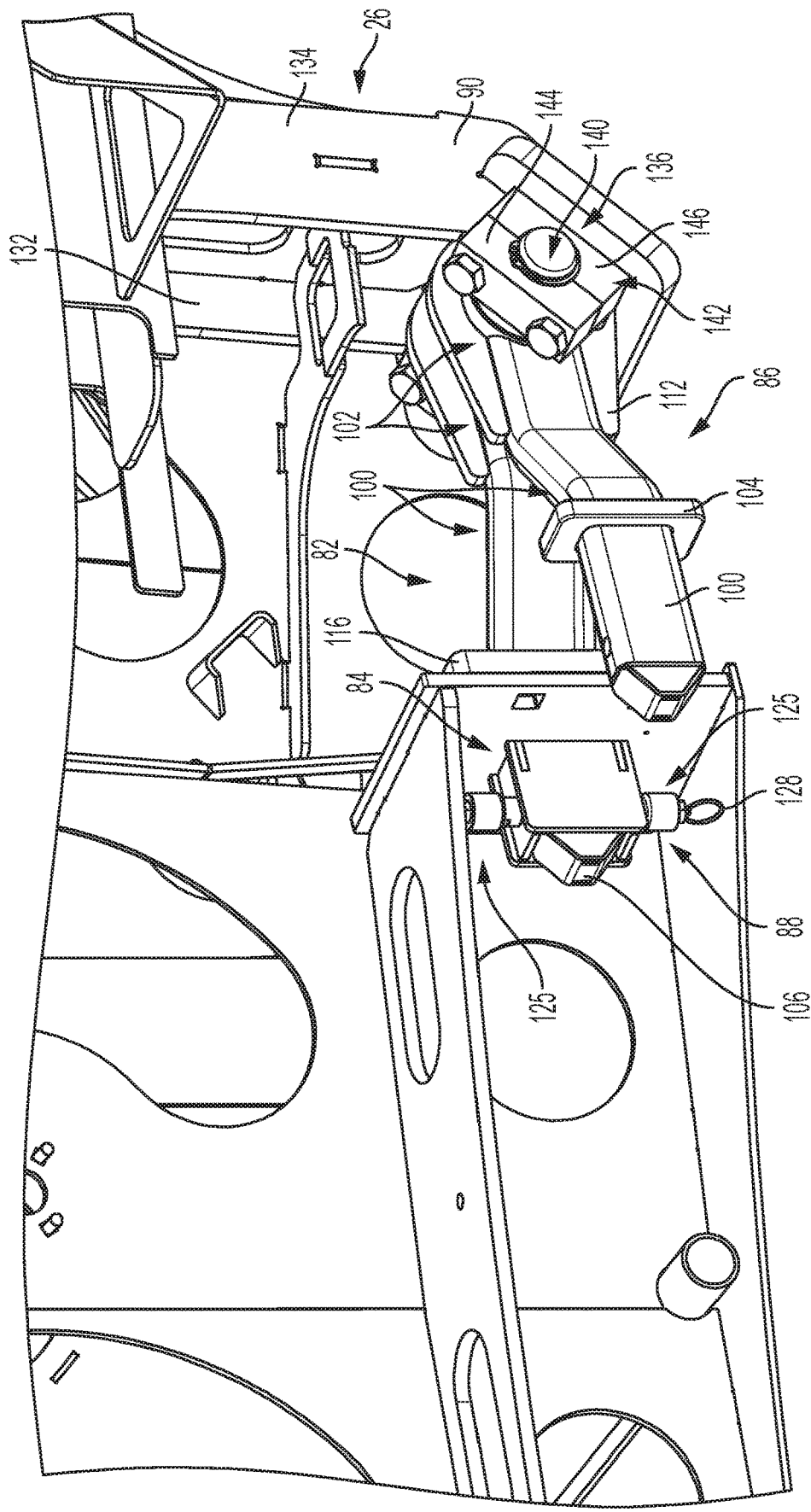
FIG. 5 illustrates a closeup perspective view of a section a basecutter and a main frame showing a male coupler rotatably coupled to the main frame.

To improve manufacturability of the work vehicle, the work vehicle includes a coupler 80 including a first male coupler 82 coupled to the mainframe 26 and a female coupler 84, also identified as a receiver, connected to the basecutter 60 as illustrated in FIG. 3. A second male coupler 86 also connected to the mainframe 26 is coupled to another female connector located at another basecutter (not shown). As seen in FIGS. 4 and 5, once the basecutter 60 is moved sufficiently forward beneath the mainframe 26, the male coupler 82 engages the female coupler 84. Once male connector 86 is sufficiently engaged with the female coupler 84, a latch mechanism 88 releasably connects the basecutter 60 to the main frame 26.

Each of the couplers 82 and 86 are rotatably coupled to the mainframe 26 at a mainframe support 90. The mainframe support 90 is centrally located at the mainframe 26 similarly to the central location of the inner frame support 68 as seen in FIG. 2. The rotational coupling of the couplers 82 and 86, when connected to respective female couplers, allows the adjacently located basecutters to adjust to the ground level upon which the basecutters move during harvesting. This configuration enables each of the basecutters to independently move along the contour of the ground when the ground is uneven. The independent movement allows each basecutter to cut stalk closer to the ground to thereby remove more stalk during a harvesting operation.

Figure 6:
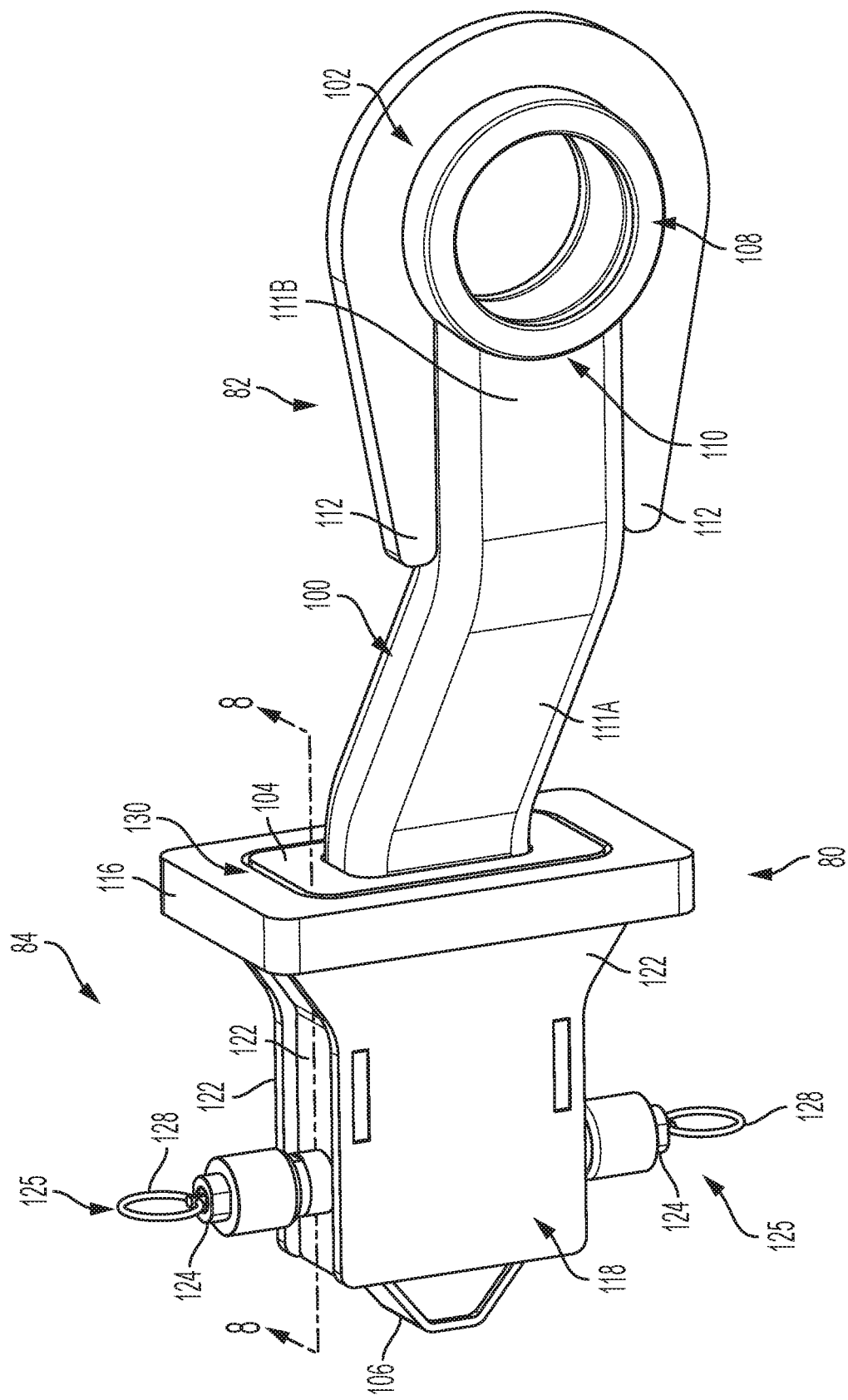
FIG. 6 illustrates a perspective view of a male coupler connected to a female coupler.

FIG. 6 illustrates the coupler 80 including the male coupler 82 and the female coupler 84. The male coupler 82 includes a leg 100 extending from a collar 102 to a locator 104. See also FIG. 3. The leg 100 extends through the locator 104 and includes a distal end 106 at the terminating end of the leg 100. See also FIG. 3. A bearing 108 is located at a proximal end 110 of the leg 100. The collar 102 surrounds a portion of the bearing 108 and includes ends 112 that extend along the leg 100 from the proximal end 110. In one embodiment as illustrated, the distal end 106 includes angled sides terminating at a shared surface to define an inclined surface that directs the distal end 106 to the female coupler 84 for insertion.

The leg 100 includes angled sections in which a centrally located section 111A is angled with respect to sections 111B and 111C located on either side of section 111A. See FIG. 7. The arm 100 is angled to accommodate the connection between the mainframe 26 and the basecutter 60 since the connecting locations are not aligned along a straight line, but are instead offset from a straight line. While the leg 100 defines either acute or obtuse angles between sections, other configurations are contemplated including a continuously curved leg. In other embodiments, a leg 100 being relatively straight is contemplated. The legs 100 of each of the couplers 82 and 84 are identical in one embodiment, with one of the legs being rotated about its longitudinal axis by 180 degrees. Legs 100 of different configurations are possible based on the relative positions of the basecutter 60 and mainframe during assembly.

Figure 7:
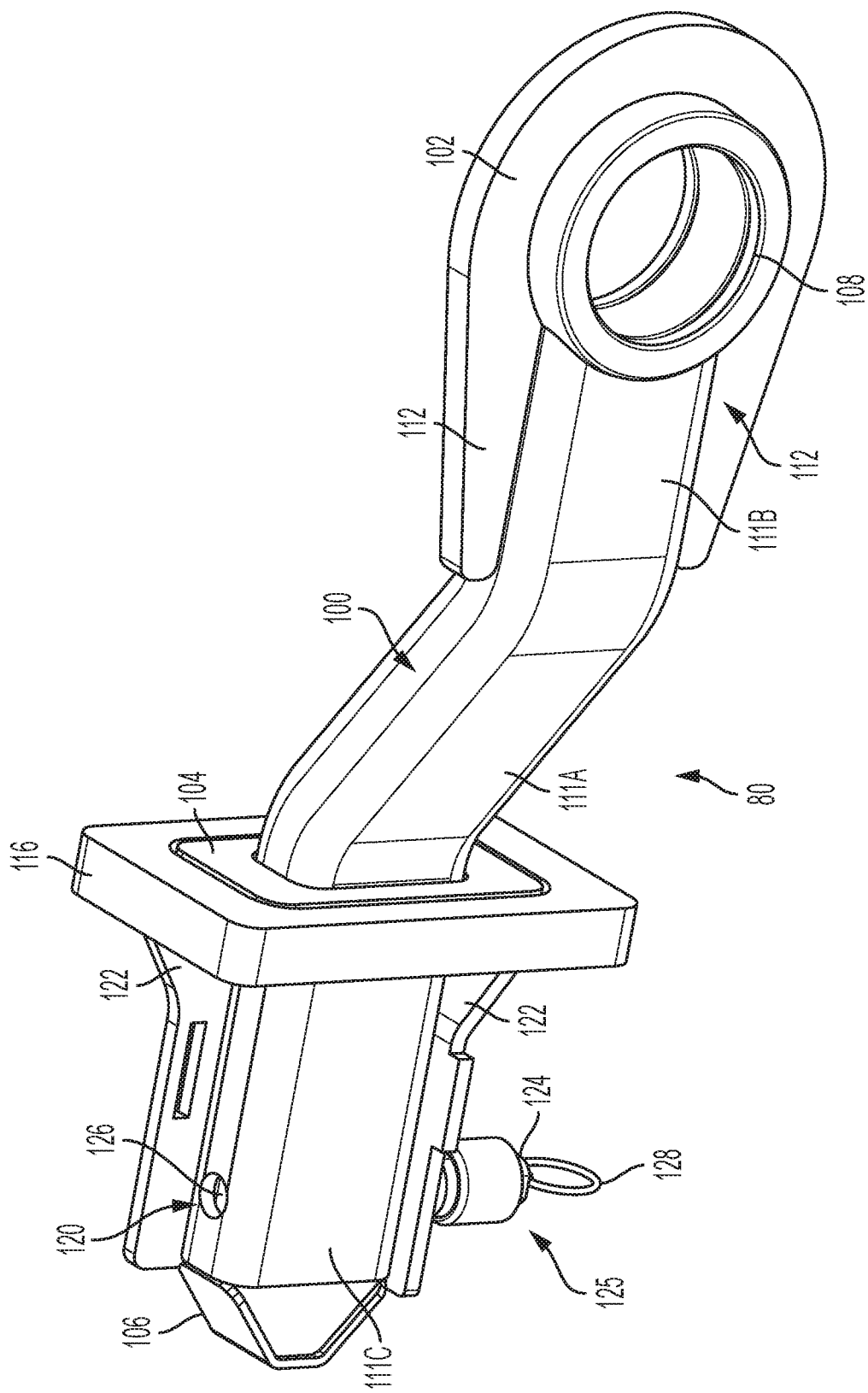
FIG. 7 illustrates a perspective view of a male coupler connected to a female coupler having a part of a housing removed.

The female coupler 84 is support by a support 114 of the basecutter 60. The female coupler 84 includes a base plate 116 that is fixedly coupled to the support 114. Extending from the base plate 116 is a housing 118 defining a chamber 120 configured to receive the distal end 106 of the leg 100. The chamber 120 is defined by sidewalls 122 of the housing 118 and is illustrated in FIG. 7, where two of the sidewalls are not illustrated. As the basecutter 60 is moved toward the main frame 26, the terminating end 106 enters the base plate 116 and is guided through the housing 118 until a pin 124 of a catch mechanism 125 engages a depression 126 located near the distal end of the leg 100. The catch mechanism 125 acts as an indexing plunger. See FIG. 7. While only one depression 126 is illustrated on a top side of the leg 100, a second depression is located on a bottom side of the leg 100 such that each of the depressions 126 engages one of the pins 124 to fix the location of the basecutter 60 with the mainframe 26. In one or more embodiments, the depression 126 includes a through-hole at a sidewall of the leg 100 or recess formed in the sidewall of the leg 100. Other types indexing parts are contemplated including raised elements on the leg 100 defining a catch location.

Figure 8:
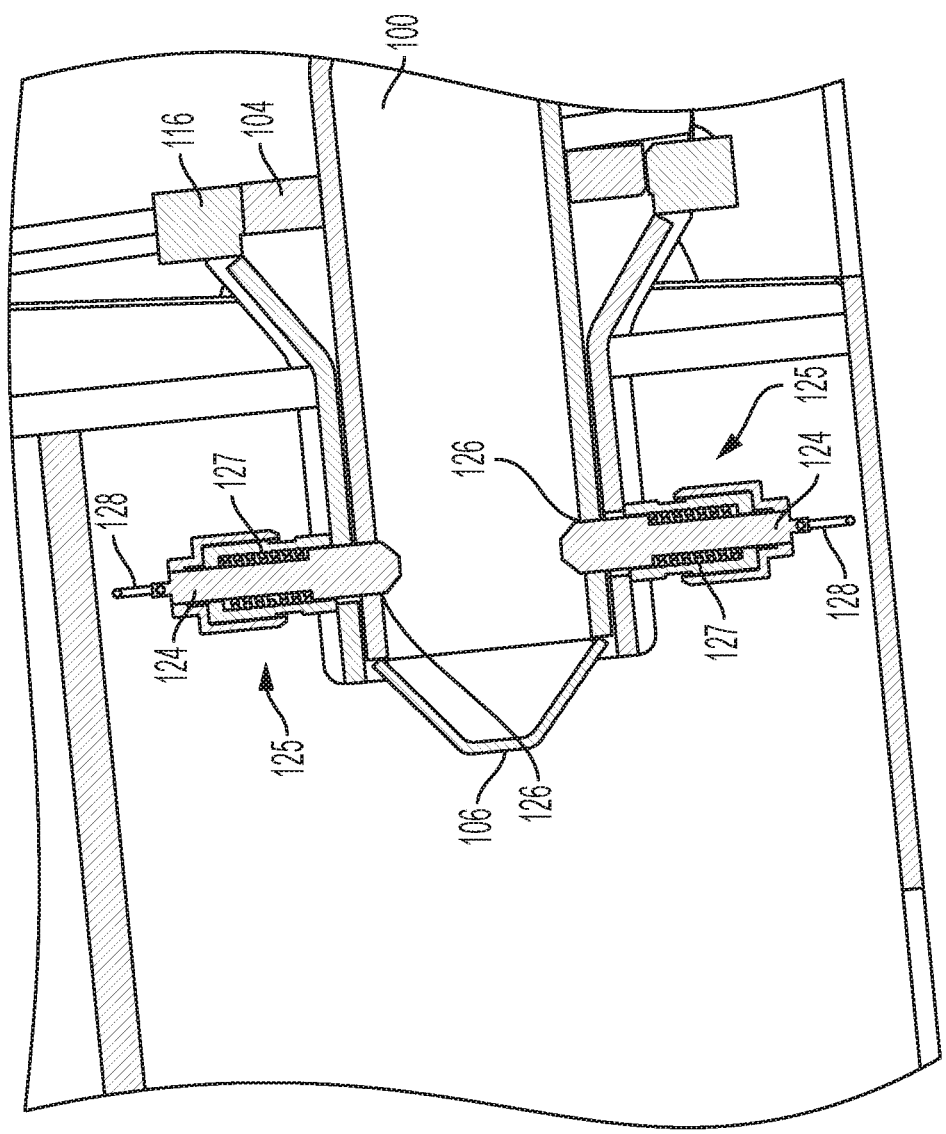
FIG. 8 illustrates a sectional side view taken along a line 8-8 of FIG. 6 of a male coupler of a mainframe connected to a female coupler of a basecutter.

As seen in a sectional view of FIG. 8, the pin 124 is spring loaded with a spring 127. The spring 127 provides a force to extend the pin 124 into the depression 126 to locate the arm 100 within the housing 122. The pin 124 is forced into the depression 126 when the depression 126 and pin 124 are appropriately located. A ring 128 enable an assembly operator to remove the pin 124 from the depression 126 to disconnect the male coupler from the female coupler.

The base plate 116 includes an aperture 130 configured to receive the locator 104. The aperture 130 in one embodiment is generally rectangular in size and receives the locator 104, also generally rectangular in size. Other configurations of the aperture 130 and the locator 104 are contemplated. The aperture 130 defines a boundary of movement of the locator 104 with the base plate 116 to substantially prevent movement of the locator 104, and therefore the leg 100, from moving side to side or up or down.

Each of the male couplers 82 and 86 is pivotably coupled to the centrally located mainframe support 90 as illustrated in FIGS. 3 and 5. The mainframe support 90 includes a first arm 132 and a second arm 134 each of which extends downwardly to hold a collar plate 136. The collar plate 136 is located to restrict rotational movement of the male coupler 82 and the male coupler 86. The bearing 108 of each coupler 82 and 86 receives a pin 140 that extends through each of the bearings 108 and though a pin coupler 142 having a first part 144 and a second part 146. In one embodiment, a sleeve or spacer, not shown, receives the pin 140 and is located between each of the bearings 108 of each of the male couplers to maintain spacing between therebetween.

The first and second parts 144 and 146, in the illustrated embodiment, are configured as substantially similar halves. The parts 144 and 146 when coupled together provide an aperture to receive the pin 140. Each half 144 and 146 is held together by connectors 148 that extend through the halves 144 and 146, the collar plate 136, and into the respective arm 132 or 134. In one embodiment the connectors are bolts. Other types of connectors are contemplated.

While the couplers 82 and 86 are free to rotate about an axis defined by the pin 140, the rotation is restricted in at least one direction by the collar plate 136. When the couplers move in the downward direction, the ends 112 of the collars 102 move into contact with the collar plate 136 thereby stopping downward rotation of the couplers 82 and 86. While not illustrated, upward rotation of the couplers can be restricted by the collars 102 moving into contact with the support 90 or other blocking part. During manufacture, in one embodiment, complete downward rotation of the couplers 82 and 86 is prevented with a temporary support. In one embodiment, the temporary support is a jack set to a height to insure the male coupler engages the female coupler during connection of the basecutter 60 to the frame 26.

Figure 9:
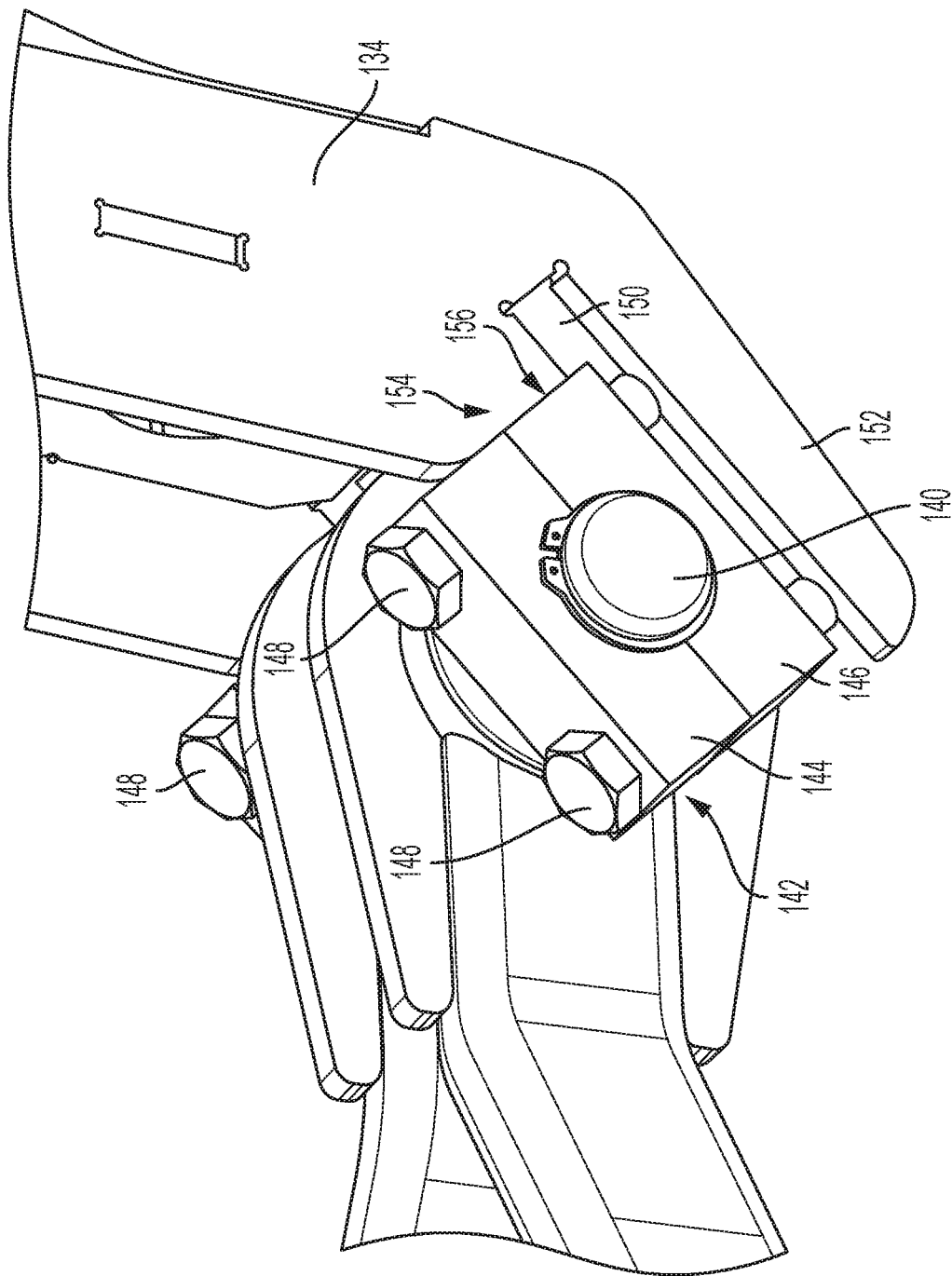
FIG. 9 illustrates an arm that supports a collar plate and a pin coupler.

FIG. 9 illustrates a configuration of the arm 134 that supports the collar plate 136, not shown. The arm 134 includes a slot 150 defined by a first extension 152 and a second extension 154. The slot receives the collar plate 136, which is fixedly coupled to the pin coupler 142. Each of the connectors 148 extends through the two halves 144 and 146, into the collar plate 136, and into the first extension 152. The second extension 154 does not extend as far as the first extension 152 and includes an abutting surface 156 upon which the two halves 144 and 146 are adjacently located. The plate 136 also supports the ends of each of the arms 132 and 134 to maintain the distance between the arms and provides reinforced stability of the arms. In other embodiments, the relative position of the arms 132 and 134 are maintained by another type of support that does not limit rotation of the couplers 82 and 86.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A sugarcane harvester for harvesting sugarcane, the harvester comprising:
 a main frame;
 a basecutter frame; and
 a coupler configured to couple the main frame to the basecutter frame, the coupler including a leg including a depression, the leg rotatably coupled to and extending from one of the main frame or the basecutter frame and a receiver fixedly coupled to the other of the main frame or the basecutter frame, and a catch located at the receiver, the catch including a spring-loaded indexing plunger, wherein the catch engages the depression of the leg to locate the main frame at a fixed distance with the basecutter frame.

2. The sugarcane harvester of claim 1 wherein the coupler includes a bearing disposed at a proximal end of the leg, the bearing providing a rotatable connection of the leg to the one of the main frame or the basecutter frame.

3. The sugarcane harvester of claim 2 wherein the coupler includes a collar coupled to the bearing and to the proximal end of the leg, wherein the collar supports the bearing at the proximal end of the leg.

4. The sugarcane harvester of claim 3 wherein the leg includes a distal end spaced from the coupler, wherein the distal end is tapered to direct the leg into the receiver.

5. The sugarcane harvester of claim 4 wherein the receiver includes a base plate coupled to the one of the main frame or the basecutter frame, the base plate including an aperture to receive the distal end of the leg.

6. The sugarcane harvester of claim 5 wherein the coupler includes a locator disposed on the leg between the proximal end of the leg and the distal end of the leg, wherein the locator is configured to be located at the aperture of the base plate.

7. The sugarcane harvester of claim 6 wherein the receiver includes a housing connected to the base plate, the housing defining a chamber to receive the distal end of the leg.

8. The sugarcane harvester of claim 7 wherein the catch engages the distal end of the leg.

9. A coupler configured to couple a first frame to a second frame of a work machine comprising:
  a leg including a depression, the leg rotatably coupled to and extending from one of the first frame or the second frame and a receiver fixedly coupled to the other of the first frame or the second frame, and a catch located at the receiver, the catch including a spring-loaded plunger wherein the catch engages the depression of the leg to locate the first frame with the second frame at a fixed distance.

10. The coupler of claim 9 wherein the coupler includes a bearing disposed at a proximal end of the leg, the coupler providing a rotatable connection to the one of the first frame or the second frame.

11. The sugarcane harvester of claim 10 wherein the coupler includes a collar coupled to the bearing and to the proximal end of the leg, wherein the collar supports the bearing at the proximal end of the leg.

12. The sugarcane harvester of claim 11 wherein the leg includes a distal end spaced from the coupler, wherein the distal end is tapered to direct the leg into the receiver.

13. The sugarcane harvester of claim 12 wherein the receiver includes a base plate coupled to the one of the first frame or the second frame, the base plate including an aperture to receive the distal end of the leg.

14. The sugarcane harvester of claim 13 wherein the coupler includes a locator disposed on the leg between the proximal end of the leg and the distal end of the leg, wherein the locator is configured to be located at the aperture of the base plate.

15. The sugarcane harvester of claim 14 wherein the receiver includes a housing operatively connected to the base plate, the housing defining a chamber to receive the distal end of the leg.

16. The sugarcane harvester of claim 15 wherein the catch engages the distal end of the leg.

17. A sugarcane harvester for harvesting sugarcane, the harvester comprising:
  a main frame;
  a basecutter frame; and
  a coupler configured to couple the main frame to the basecutter frame, the coupler including a leg rotatably coupled to and extending from one of the main frame or the basecutter frame and a receiver fixedly coupled to the other of the main frame or the basecutter frame, and a catch located at the receiver, wherein the catch engages the leg to locate the main frame at a fixed distance with the basecutter frame; wherein the coupler includes a bearing disposed at a proximal end of the leg, the bearing providing a rotatable connection of the leg to the one of the main frame or the basecutter frame, wherein the coupler includes a collar coupled to the bearing and to the proximal end of the leg, wherein the collar supports the bearing at the proximal end of the leg, and wherein the leg includes a distal end spaced from the coupler, wherein the distal end is tapered to direct the leg into the receiver.

18. The sugarcane harvester of claim 17 wherein the receiver includes a base plate coupled to the one of the main frame or the basecutter frame, the base plate including an aperture to receive the distal end of the leg.

19. The sugarcane harvester of claim 18 wherein the coupler includes a locator disposed on the leg between the proximal end of the leg and the distal end of the leg, wherein the locator is configured to be located at the aperture of the base plate.

20. The sugarcane harvester of claim 19 wherein the receiver includes a housing connected to the base plate, the housing defining a chamber to receive the distal end of the leg.

* * * * *